United States Patent Office 3,363,878
Patented Jan. 16, 1968

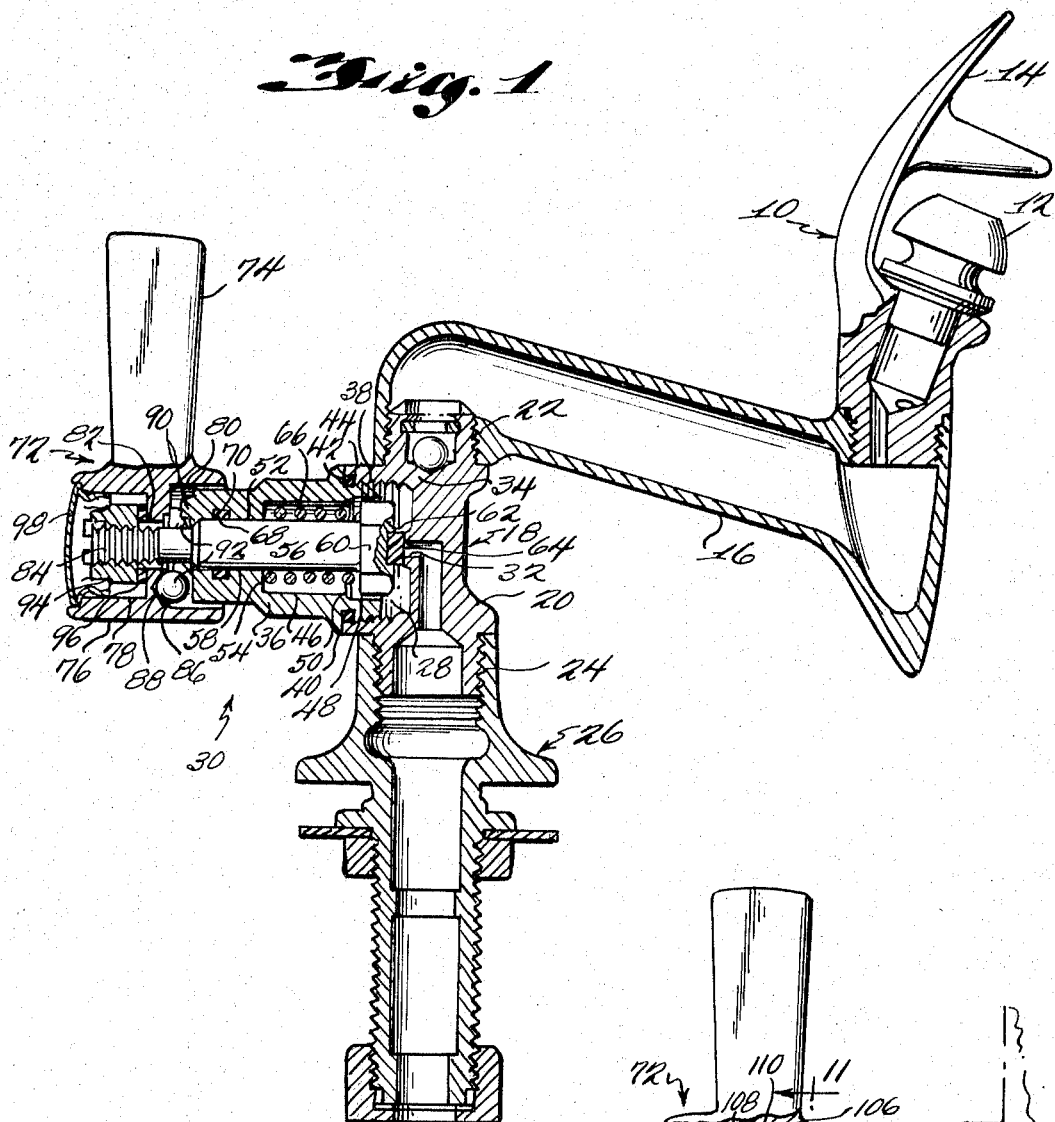

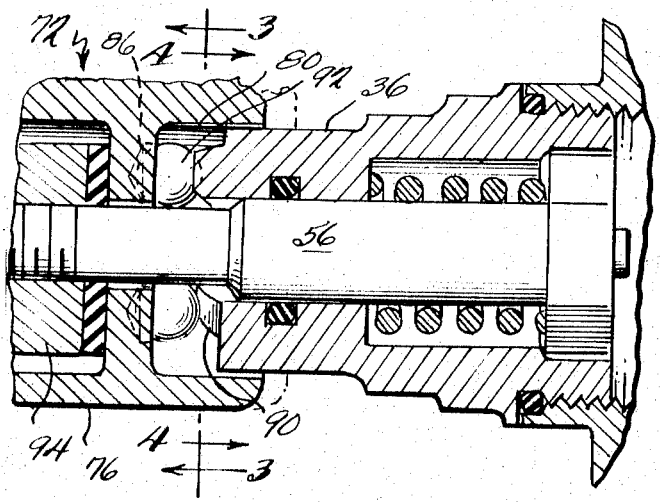
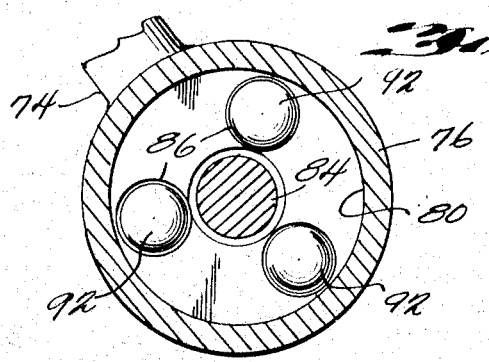
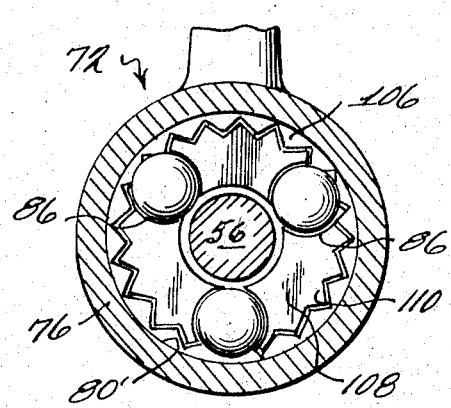
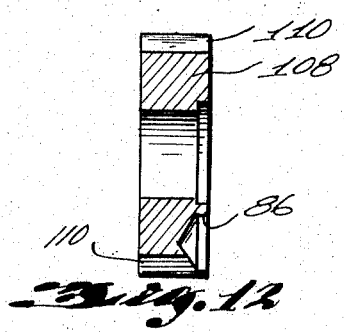
INVENTORS
JOHN J. SMITH
LAWRENCE F. LUCKENBILL
ATTORNEYS

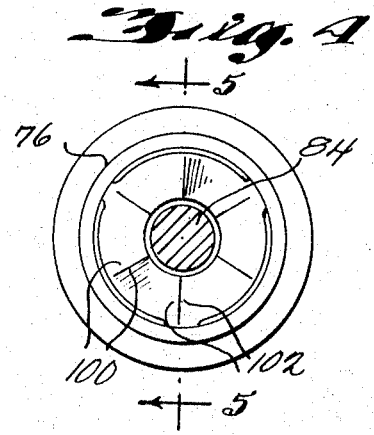
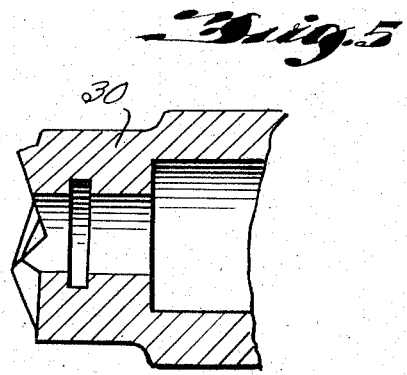
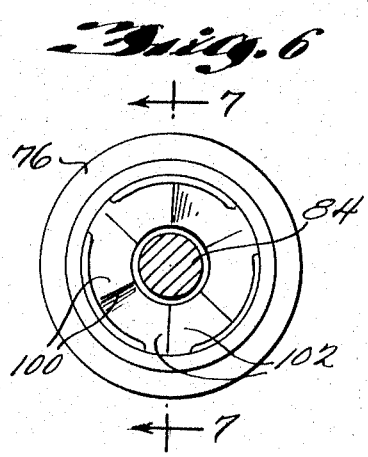
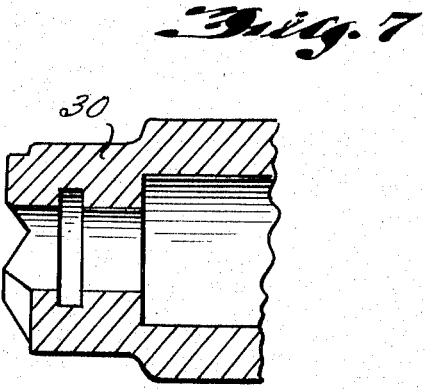
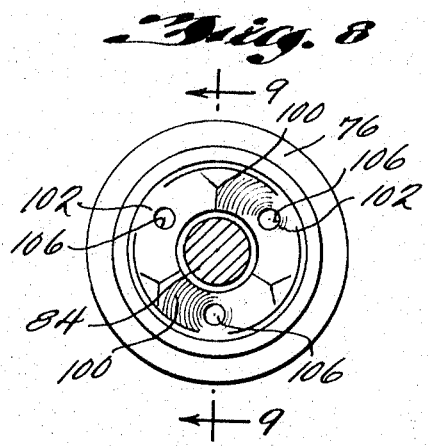
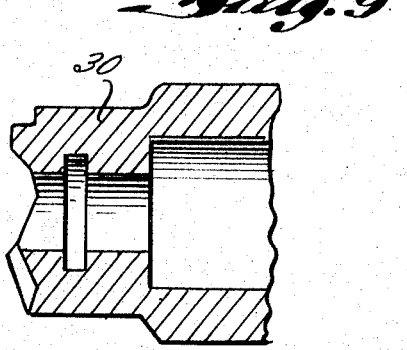

3,363,878
SELF-CLOSING VALVE
John J. Smith and Lawrence F. Luckenbill, Decatur, Ill., assignors to Mueller Co., Decatur, Ill., a corporation of Illinois
Filed June 17, 1964, Ser. No. 375,837
7 Claims. (Cl. 251—253)

This invention relates to a manual valve and, more particularly, to an improved valve construction of the self-closing type.

In the past, a number of arrangements have been utilized to fabricate a manual, self-closing valve. The most simple of these prior valves includes a spring loaded valve member which is actuated by the straight line displacement of a valve handle. However, in the development of the self-closing valve, an important variation has been one which is actuated by the rotary displacement of the valve handle. It is this latter type of manual self-closing valve to which the improvements of the present invention are particularly directed.

Manual, self-closing valves have been fabricated in the past utilizing balls, or rollers, which are moved into engagement with a camming surface upon actuation of the valve handle to open the valve and which, on release of the handle, return to their original position thereby closing the valve. However, prior arrangements suffer a disadvantage occasioned by the balls or rollers being displaced from their correct position with respect to the valve handle and the cam surface thereby rendering the valve inoperative. To overcome this problem, other known constructions have employed rather elaborate assemblies for properly locating the balls or rollers.

It is a principal object of the present invention to provide an improved, economical, manual, self-closing valve which is simple in construction and which is capable of continuous proper operation.

Another object of the invention is to provide an effective manual, self-closing valve construction which does not require an expensive assembly arrangement for locating the rollers or the balls.

A still further object of the invention is to provide a valve construction to permit selection of a number of handle positions.

An additional object of the invention is to provide a valve construction having improved sealing and stop means.

Further objects and the entire scope of the invention will become more fully apparent when considered in light of the following detailed description of illustrative embodiments of this invention and from the appended claims.

The illustrative embodiments may be best understood by reference to the accompanying drawings wherein:

FIGURE 1 is a side elevation view, partially in section, of a first embodiment of the invention as employed in a drinking fountain, the valve being shown in its closed position;

FIGURE 2 is an enlarged side elevation view, partially in section, of a portion of the structure shown in FIGURE 1, the valve being illustrated in its opened position;

FIGURE 3 is a view in section taken along line 3—3 of FIGURE 2;

FIGURE 4 is a view in section taken along line 4—4 of FIGURE 2;

FIGURE 5 is a fragmentary view in section of the spring chamber taken along line 5—5 of FIGURE 4;

FIGURE 6 is a view in section of a first alternative cam arrangement which may be substituted for the cam illustrated in FIGURE 4;

FIGURE 7 is a fragmentary view in section of the spring chamber taken along line 7—7 of FIGURE 6;

FIGURE 8 is a view in section of a second alternative cam arrangement which may be substituted for the cam illustrated in FIGURE 4;

FIGURE 9 is a fragmentary view in section of the spring chamber taken along line 9—9 of FIGURE 8;

FIGURE 10 is a side elevation view, partially in section, of a second embodiment of the invention;

FIGURE 11 is an enlarged view in section taken along line 11—11 of FIGURE 10; and FIGURE 12 is a side elevation view, in section, of a handle insert employed in the embodiment of FIGURE 10.

Briefly, the invention comprises a manually operated, self-closing valve which is moved between its open and closed positions by rotary motion of a valve handle. To the valve handle there is connected one end of a valve stem the principal portion of which is rotatably and longitudinally movable within a stationary spring chamber. Interposed between the spring chamber and the valve handle are a plurality of loose balls which are positioned within recesses provided in the handle itself, or in a handle insert located between the balls and the handle. These balls are held in contact with cam surfaces at the end of the spring chamber by means of a spring arrangement within the chamber which urges the valve stem towards its closed position. On rotation of the valve handle, the balls cooperate with the cam surfaces to displace the handle laterally away from the spring chamber. Since one end of the valve stem is connected to the valve handle, the stem is moved longitudinally against the action of the spring to thereby open the valve. On release of the valve handle, the spring urges the valve stem in the direction of closing, and since no opposition is encountered, the balls run down the cam surfaces to move the valve handle rotatably and laterally to its initial position thereby permitting the valve stem to return to its closed position. Continuous proper operation of the camming action is achieved by proper location of the loose balls. The recesses which position the balls have a configuration which is cylindrical at the top portion and conical thereunder. The cylindrical portion defines a square ridge at the beginning of the recess, this ridge preventing its associated ball from leaving the recess during operation. Rotation of the valve handle is limited by stop means provided within the spring chamber. The stop means includes a machined shoulder within the chamber which cooperates with the front portion of the valve stem to restrict its longitudinal movement as the valve is opened. In the embodiment utilizing a handle insert between the valve handle and the balls, the handle position may be selected as a spline arrangement is utilized to interconnect the handle and the insert.

Referring to FIGURE 1 of the drawings, an application utilizing one embodiment of the improved, manual, self-closing valve will be described. The construction shown in FIGURE 1 is that of a drinking fountain. The drinking fountain assembly is illustrated generally at 10 and comprises a discharge device 12 and a deflection and shielding element 14. This drinking fountain assembly is of a conventional design and need not be discussed further. The assembly 10 is joined by connector element 16 to the flow control device designated generally as 18. The flow control device 18 comprises a main body 20 having at opposite ends thereof threaded projecting portions 22 and 24. The connector element 16 is threaded onto projection 22, as shown. The projection 24 is joined to a supply line and fixture connector assembly, illustrated generally at 26. This assembly comprises several connector elements all of which are well known in the prior art and which form no part of the present invention. Accordingly, these elements need not be described in detail. It will be understood that the assembly attaches the drinking fountain to a suitable fixture (not shown) and serves as an access to the supply line for supplying water to the drinking fountain.

The complete structure of the flow control device will not be set forth in detail as this device is the subject of a copending application Ser. No. 331,209, entitled, "Flow Controller," filed on Dec. 17, 1963, by Lawrence F. Luckenbill, a co-inventor in this application. However, the basic flow pattern will be described.

On one side of the flow control device 18 an internally threaded recess 28 is provided. Projecting into this recess is the manual, self-closing valve which constitutes the present invention, this valve being designated generally as 30. The valve assembly is designed such that only a portion of the recess is occupied by the assembly 30. The remaining portion serves as a communication chamber for fluid flow. When the valve is opened, water from the supply line passes through valve port 32 into the communication chamber, and thereafter travels through bore 34 and the remainder of the flow control device to the drinking fountain assembly 10.

The details of the first embodiment of the invention will be described with reference to FIGURES 1-4. In FIGURE 1 the valve 30 is shown in its closed position. The valve comprises a spring chamber 36 which is exteriorly threaded at one end 38 thereof to engage the threads of recess 28. The spring chamber is provided with an exterior flange 40 rearwardly of the threaded end 38, which flange engages the exterior of body 20 of the flow control device to limit the projection of the valve 30 into recess 28. Immediately adjacent the forward surface of flange 40 a recess 42 is provided about the periphery of the spring chamber, this recess extending to a depth greater than the threads of end 38. An O-ring 44 of suitable sealing material, such as rubber, is positioned within the recess 42 to prevent water from leaking out of the communication chamber along the threaded end 38 and past flange 40. At the forward end of spring chamber 36 a pair of coaxial, substantially cylindrical recesses are provided. The inner recess 46 extends an appreciably greater depth than the larger diameter recess 48 resulting in a shoulder 50 being developed at the bottom of recess 48. Axially aligned with recesses 46 and 48, a bore 52 extends through the remainder of the spring chamber 36, bore 52 being of lesser diameter than recess 46 to thereby produce an annular surface 54 at the bottom of the recess.

Within the spring chamber 36 a valve stem 56 is positioned. The stem comprises a rod portion 58 having a slightly smaller diameter than bore 52 to permit portion 58 to extend therethrough. At the forward end of the rod portion 58 a hexagonal stem head 60 is provided. Head 60 is positioned within recess 48. The head is dimensioned such that its rearward motion is limited by engagement with shoulder 50. On the front surface of head 60 a recess 62 is machined. A seat washer 64 is mounted therein to project forwardly of head 60. Surrounding portion 58 of valve stem 56 intermediate the rear of head 60 and annular surface 54 of recess 46 is a compression spring 66. Spring 66 normally urges the valve stem 56 to the right, as shown in FIGURE 1, to position washer 64 to cover valve port 32 thereby preventing flow to the drinking fountain assembly 10. An interior recess 68 is machined in the spring chamber 36 intermediate surface 54 and the rear end of the chamber. Within this recess an O-ring 70 is positioned. This ring engages portion 58 of valve stem 56 to prevent water from leaking from the valve via bore 52.

The valve handle, indicated generally at 72, is mounted to the valve assembly 30 with respect to the rearward portions of spring chamber 36 and valve stem 56. More particularly, the handle arm 74 extends outwardly from the valve handle body 76. The handle body is provided with axially aligned recesses 78 and 80 on opposite ends thereof, communication between these recesses being achieved by a bore hole 82 machined through the remainder of the handle body along the common axis. Bore hole 82 is of a slightly greater diameter than the partially threaded rear portion 84 of the valve stem 56 and recess 80 is slightly greater in diameter than the rear portion of spring chamber 36. A plurality of radially spaced recesses are provided in the handle body 76 at the bottom of recess 80. Each of these spaced recesses comprises a cylindrical upper portion 86 having a conical portion 88 thereunder. In the illustrative embodiment three such recesses are employed.

Radially spaced cam surfaces 90 (more clearly seen in FIGURES 2 and 4) are formed on the rear surface of the spring chamber 36. A ball 92 having a diameter slightly less than that of cylindrical portion 86 is seated on the conical portion 88 of each of the radially spaced valve body recesses and engages (in FIGURE 1) the dwell portions of its respective cam surfaces 90. The valve handle is held in a manner to effect this relationship by means of a thrust nut 94 screwed onto the threaded area of the rear portion 84 of valve stem 56. Thrust nut 94 is of the locking type to discourage loosening during valve operation thereby eliminating the requirement of pins and the like employed in known constructions. To insure proper handle repositioning when the handle is released after actuation thereof, a friction washer is employed with nut 94, the washer providing low friction surfaces for promoting rotation between the handle and the stem. With the valve handle in this position, the rear portion of spring chamber 36 projects within recess 80 in the valve handle body. Recess 78 is covered by means of a tamper-proof cap, such as the snap-type cap illustrated at 98, or a cap which is pinned to the valve stem and valve handle.

The relationship which exists when the valve is opened may be appreciated by reference to FIGURE 2. When handle 74 is manually rotated, the handle body 76 is rotatably displaced. Since the cylindrical recesses 86 in the valve body at the bottom of recess 80 provide square ridges over which the balls 92 cannot ride, these balls are displaced with handle body 76. The spring chamber 36 being stationary, the balls move with respect to cam surfaces 90 towards the rise portions of the cams thereby laterally displacing the valve stem. Since the valve stem 56 is fixed to the handle body 76 by means of thrust nut 94, the valve stem is longitudinally displaced against the action of spring 66 to move washer 64 out of covering relationship with valve port 32 thereby permitting water to flow to the drinking fountain assembly 10. The flow may be increased by further rotation of the valve handle 72 until a point is reached at which the rear surface of stem head 60 engages the shoulder 50 at the bottom of recess 48 in the forward end of the spring chamber 36. At this point the rear end of the spring chamber 36 still projects within recess 80 in the handle body 76.

On release of the valve handle, the compression spring 66 urges the valve stem and its attached seat washer 64 towards the valve port 32. This results in the lateral and rotary displacement of the valve handle 72 as the balls 92 move towards the dwell positions of the cams 90. This movement continues until the valve port 32 is covered at which time the static position illustrated in FIGURE 1 is reached.

The details of the ball positioning arrangement and the cam surfaces may be more fully appreciated by reference to FIGURES 3 and 4. In FIGURE 3 the ball arrangement is illustrated. The three balls 92 are radially spaced at equal intervals within the recess 80 of handle body 76. The cam surfaces 90 are illustrated in FIGURE 4. As stated previously, these inclined surfaces defining the cams are formed at the rear of the spring chamber 36 and are radially positioned with respect to the axis of bore hole 52 within the chamber. The angle of each of the tapered inclined cam surfaces 90 is preferably 21°. This is to insure that the valve opens sufficiently and prevents the handle from jumping out of position if the balls reach the crest of their respective cam surfaces before the rearward movement of valve stem 56 is arrested by contact of head 60 with shoulder 50. Six inclined surfaces are shown, the shading indicating the rise portion 100 and the dwell portion 102 of each cam surface. From FIGURE 5 it will be appreciated that the radial lines defining the edges of the rise and dwell portions of the cam surfaces extend from a single point on the center line of spring chamber 36.

Alternative cam arrangements which may be substituted for that just described are illustrated in FIGURES 6-9. The first alternative shown in FIGURES 6 and 7 is similar to that previously described with the exception that all radial lines defining the edges of the rise and dwell portions are substantially parallel and intersect a common center line. This alternative arrangement, as well as that shown in FIGURES 4 and 5, is preferably formed by a casting operation although other fabricating methods may be employed.

The second alternative cam arrangement is produced by providing drill spots 106 at radially spaced positions on the rear surface of spring chamber 36. The dwell portion of the cam arrangement is, of course, located at the center of the drill spots. The shading of FIGURE 8 indicates the contour of the inclined surfaces developed.

A second embodiment of the improved, manual, self-closing valve may be described with reference to FIGURES 10-12 of the drawings. In FIGURE 10 the entire valve structure is illustrated. This embodiment is identical to that shown in FIGURE 1 with the exception that the recesses for seating the balls 92 are not formed in the handle body 76 but rather are provided in a handle insert interposed between the balls and the handle body. More specifically, the handle 72 is provided with internal splines, these comprising projecting splines 106 within the substantially cylindrical recess 80' of handle body 76. A substantially annular handle insert 108 having peripheral splines 110 complementary with the internal splines 106 is inserted within recess 80' to mesh with splines 106. The bore hole of the insert 108 is dimensioned to permit passage of the valve stem 56 therethrough. The surface of insert 108 is provided with three radially spaced recesses 112 for seating balls 92. These recesses are identical with those described with respect to the embodiment of FIGURE 1, and each comprises a cylindrical recess having a conical depression thereunder. The details of the handle insert 108 may be appreciated by reference to FIGURES 11 and 12.

The valve structure shown in FIGURE 10 functions identically to the first embodiment described previously. However, by utilizing a handle insert arrangement, an additional feature may be realized. More particularly by varying the relative positions by which the handle insert 108 engages the internal splines 106 of the handle body 76, a number of different handle positions may be obtained. Therefore, the embodiment of FIGURE 10 permits the selection of handle positions to conveniently correspond to the application in which the valve is employed.

The above described embodiments are illustrative of preferred embodiments of the invention but are not intended to limit the possibilities of insuring the principal feature of improved operation without binding of the operative parts of the valve structure. For example, rather than employing radially spaced cylindrical recesses 86 in the valve handle, or in the handle insert, to accommodate balls 92, modified radially spaced recesses, each in the form of a right rectangular prism having a triangular prism depression thereunder, may be utilized to receive rollers instead of balls. The recesses in such an arrangement would be oriented such that the longitudinal axes of the rollers, when seated in their respective recesses, would converge at the center of the handle or the handle insert. Of course, in this embodiment the alternative cam arrangement of FIGURES 8 and 9 would not be employed. The manual, self-closing valve designs disclosed herein are examples of arrangements in which the inventive features of this disclosure may be utilized, and it will become apparent to one skilled in the art that certain modifications may be made within the spirit of the invention as defined by the appended claims.

What is claimed is:

1. A self-closing valve construction of the type actuated by the rotary displacement of a valve handle to control fluid flow from a valve port comprising: a stationary housing, including a spring chamber, having a bore hole therethrough, a valve stem positioned within said bore hole and extending outwardly of the rear of said housing, said valve stem having a head portion at the inner forward end thereof, spring means positioned within said chamber and engaging a rear surface of said head to urge said head forwardly of said chamber towards said valve port, stop means comprising a shoulder within said spring chamber for engaging the rear surface of said head to limit the movement of said valve stem away from the valve port, a plurality of outwardly extending cam surfaces formed on the rear portion of said housing, said cam surfaces being radially spaced with respect to the axis of said bore hole; means for connecting said valve handle to the portion of said valve stem extending outwardly of said housing, and a ball associated with each of said cam surfaces interposed between the valve handle and said cam surfaces to permit rotary and longitudinal displacement of the valve stem on actuation of said handle thereby moving the head portion of said stem away from said valve port in opposition to the force exerted by said spring, the relative positions of the head and the valve port controlling the fluid flow from said port, said valve handle being provided with individual recesses having substantially the same diameter as said balls and receiving each of said balls, each recess accurately positioning its associated ball during actuation of said valve handle, said recesses being radially spaced with respect to the axis of the portion of said valve stem connected to said handle and having configurations which are cylindrical at the top portion and conical thereunder to define square ridges on the surface of said handle thereby preventing each ball from leaving its recess during rotation of said valve handle.

2. A self-closing valve construction as set forth in claim 1 wherein said chamber is provided with an annular interior recess in communication with said bore hole, an O-ring positioned within said annular recess to contact said valve stem to prevent fluid leakage through said spring chamber.

3. A self-closing valve construction as set forth in claim 1 wherein the rear portion of said housing has a plurality of drill spots therein defining dwell portions of said cam surfaces.

4. A self-closing valve construction of the type actuated by the rotary displacement of a valve handle to control fluid flow from a valve port comprising: a stationary spring chamber having a bore hole therethrough, a valve stem positioned within said bore hole and extending rearwardly of said chamber, said valve stem having a head portion at the forward end thereof, spring means positioned within said chamber and engaging the rear surface of said head to urge said head forwardly of said chamber towards said valve port, a plurality of cam surfaces formed on the rear portion of said chamber, said cam surfaces being radially spaced with respect to the axis of said bore hole; means for connecting said valve handle to the portion of said valve stem extending rearwardly of said spring chamber, and a ball associated with each of said cam surfaces interposed between the valve handle and said cam surfaces to permit rotary and longitudinal displacement of the valve stem on actuation of said handle thereby moving the head portion of said stem away from said valve port in opposition to the force exerted by said spring, the relative positions of the head and the valve port controlling the fluid flow from said port, said valve handle being provided with an internally splined recess within which the rear portion of said spring chamber projects, a handle insert having peripheral splines thereon complementary with said internal splines, said insert being selectively operatively connected to said valve handle by meshing said splines, the handle insert being interposed between, and in contacting relationship with, the handle and said balls, said handle insert being provided with individual recesses for seating each of said balls, each recess having a configuration which is cylindrical at the top portion and conical thereunder to define a square ridge on the surface of the handle insert thereby preventing its associated ball from leaving the recess during rotation of said valve handle.

5. A self-closing valve construction as set forth in claim 4 wherein said spring chamber has a plurality of drill spots therein defining said cam surfaces.

6. A self-closing valve construction of the type actuated by the rotary displacement of a valve handle to control fluid flow from a valve port comprising: a stationary spring chamber, a valve stem mounted for rotatable and longitudinal movement within said chamber, spring means positioned within said chamber and operatively related to said valve stem to urge said stem forwardly of said chamber towards said valve port, at least one cam surface formed on the rear portion of said chamber; means for connecting said valve handle to the valve stem rearwardly of said spring chamber, at least one ball interposed between the valve handle and said cam surface to permit displacement of the valve stem rotatably and longitudinally on actuation of said valve handle thereby moving the valve stem away from said valve port in opposition to the force exerted by said spring, the relative positions of the valve stem and the valve port controlling the fluid flow from said port, and a handle insert operatively connected to said valve handle and interposed between, in contacting relationship with, the handle and said balls, said handle insert being provided with individual recesses for seating each of said balls, each recess having a configuration which is cylindrical at the top portion and conical thereunder to define a square ridge on the surface of the handle insert thereby preventing its associated ball from leaving the recess during rotation of said valve handle, and means for varying the operative connection between the handle insert and the valve handle to thereby permit selection of handle positions.

7. A self-closing valve construction as set forth in claim 6 wherein said spring chamber has at least one drill spot therein to define each cam surface.

References Cited

UNITED STATES PATENTS

| 1,069,876 | 8/1913 | Houser | 251—263 X |
| 1,274,646 | 8/1918 | Watrous | 251—254 |
| 1,672,235 | 6/1928 | Taylor | 251—263 X |
| 2,294,487 | 9/1942 | Stettner | 137—505.42 X |

FOREIGN PATENTS 740,527   11/1955   Great Britain.

WILLIAM F. O'DEA, *Primary Examiner.*

D. R. MATTHEWS, *Assistant Examiner.*